US00RE41891E

(19) United States
(12) Reissued Patent
Sato

(10) Patent Number: US RE41,891 E
(45) **Date of Reissued Patent: *Oct. 26, 2010**

(54) CELLULAR COMMUNICATION SYSTEM, AND MOBILE AND BASE STATIONS USED IN THE SAME

(75) Inventor: Toshifumi Sato, Tokyo (JP)

(73) Assignee: NEC Corporation, Tokyo (JP)

( * ) Notice: This patent is subject to a terminal disclaimer.

(21) Appl. No.: 10/868,886

(22) Filed: Jun. 17, 2004

(65) Prior Publication Data

US 2004/0229617 A1 Nov. 18, 2004

Related U.S. Patent Documents

Reissue of:
(64) Patent No.: 6,141,555
Issued: Oct. 31, 2000
Appl. No.: 09/090,013
Filed: Jun. 3, 1998

U.S. Applications:
(

(63) Continuation of application No. 10/282,449, filed on Oct. 29, 2002, now Pat. No. Re. 39,735.

(30) Foreign Application Priority Data

Jun. 9, 1997 (JP) ..... 9-151072

(51) Int. Cl.
*H04W 36/00* (2006.01)
*H04W 4/00* (2006.01)
*H04M 1/00* (2006.01)

(52) U.S. Cl. ..... 455/437; 455/442; 455/438; 455/525; 370/331; 370/332

(58) Field of Classification Search ..... 455/436, 455/437, 438, 442, 525; 370/331, 332
See application file for complete search history.

(56) References Cited

U.S. PATENT DOCUMENTS 4,485,486 A 11/1984 Webb et al.
4,765,753 A 8/1988 Schmidt
4,926,421 A 5/1990 Kawano et al.
4,955,082 A 9/1990 Hattori et al.
5,042,082 A 8/1991 Dahlin
5,101,501 A * 3/1992 Gilhousen et al. ..... 455/442
5,109,527 A 4/1992 Akerberg
5,117,502 A 5/1992 Onoda et al.
5,179,571 A 1/1993 Schilling
5,184,347 A 2/1993 Farwell et al.
5,195,091 A 3/1993 Farwell et al.
5,200,957 A 4/1993 Dahlin
5,203,010 A 4/1993 Felix et al.
5,228,029 A 7/1993 Kotzin
5,245,610 A 9/1993 Lindell
5,260,943 A 11/1993 Comroe
5,267,261 A * 11/1993 Blakeney et al. ..... 370/332
5,276,906 A 1/1994 Felix
5,278,892 A 1/1994 Bolliger et al.
5,285,447 A 2/1994 Hulsebosch
5,293,643 A 3/1994 Israelsson
5,323,446 A 6/1994 Kojima et al.
5,329,635 A 7/1994 Wadin et al.
5,345,467 A 9/1994 Lomp et al.
5,371,738 A 12/1994 Moelard et al.
5,390,366 A 2/1995 Kasugai
5,408,514 A 4/1995 Sakamoto et al.
5,408,517 A 4/1995 Nyhart et al.
5,416,797 A 5/1995 Gilhousen et al.
5,420,863 A 5/1995 Taketsugu et al.
5,432,843 A 7/1995 Bonta
5,438,565 A 8/1995 Hemmady et al.
5,448,569 A 9/1995 Huang et al.
5,483,668 A 1/1996 Malkamaki et al.
5,487,065 A 1/1996 Acampora et al.
5,493,563 A 2/1996 Rozanski et al.
5,504,935 A 4/1996 Vercauteren
5,521,963 A 5/1996 Shrader et al.
5,548,808 A * 8/1996 Bruckert et al. ..... 455/442
5,548,812 A 8/1996 Padovani et al.
5,555,445 A * 9/1996 Booth ..... 455/436
5,574,983 A * 11/1996 Douzono et al. ..... 455/69
5,577,022 A 11/1996 Padovani et al.
5,594,718 A 1/1997 Balley et al.
5,721,733 A * 2/1998 Wang et al. ..... 370/332
5,754,956 A * 5/1998 Abreu et al. ..... 455/434

| | | | | | |
|---|---|---|---|---|---|
| 5,771,451 | A | * | 6/1998 | Takai et al. | 455/442 |
| 5,845,212 | A | * | 12/1998 | Tanaka | 455/437 |
| 5,898,682 | A | * | 4/1999 | Kanai | 370/331 |
| 5,933,777 | A | * | 8/1999 | Rahman | 455/450 |
| 6,021,123 | A | * | 2/2000 | Mimura | 370/331 |
| 6,055,428 | A | * | 4/2000 | Soliman | 455/437 |
| 6,151,502 | A | * | 11/2000 | Padovani et al. | 455/442 |
| 6,198,928 | B1 | * | 3/2001 | Keurulainen et al. | 455/436 |
| 6,381,233 | B1 | * | 4/2002 | Sunaga | 370/335 |
| 7,006,828 | B1 | * | 2/2006 | Czaja et al. | 455/442 |

FOREIGN PATENT DOCUMENTS

| | | | |
|---|---|---|---|
| EP | 0756391 | * | 1/1997 |
| WO | WO 97/08911 | * | 3/1997 |

* cited by examiner

*Primary Examiner*—Duc M Nguyen

(74) *Attorney, Agent, or Firm*—Dickstein, Shapiro, LLP.

(57) ABSTRACT

When a mobile station becomes a soft handover state, a reception quality monitor 104 measures reception quality of a pilot signal from each base station. Base station specifying means 105 generates a base-station select signal (BSse1) to specify base stations that have transmitted pilot channels of inferior reception quality. The base-station select signal is multiplexed with transmission data (r-txd), and the multiplexed signal is spread at a spreading circuit. The spread signal is transmitted to plural base stations through a transmitter 111 and a duplexer 102. Then the base stations specified by this base-station specify signal stops transmission of downward signals.

19 Claims, 6 Drawing Sheets

CELLULAR COMMUNICATION SYSTEM, AND MOBILE AND BASE STATIONS USED IN THE SAME

Matter enclosed in heavy brackets [ ] appears in the original patent but forms no part of this reissue specification; matter printed in italics indicates the additions made by reissue.

*CROSS-REFERENCE TO RELATED APPLICATIONS*

*Notice: More than one reissue application has been filed for the reissue of U.S. Pat. No. 6,141,555. The reissue applications are application Ser. Nos. 10/868,886 (the present application) and 10/282,449, now U.S. Pat. No RE39,735, of which the present application is a continuation, and both of which are reissues of U.S. Pat No. 6,141,555.*

BACKGROUND OF THE INVENTION

The present invention relates to a mobile communication system, and particularly to a handover technique for mobile or portable telephone systems (cellular systems) using a direct spread code division multiple access (DS-CDMA) system. More particularly, it relates to a transmit power control of down links for transmission from plural base stations to a mobile station during soft handover where the mobile station is simultaneously connected to the plural base stations.

A conventional technique well known in the art is a cellular system using a code division multiple access (CDMA) system conforming a North American TIA/EIA IS-95 standard. This IS-95 standard uses soft handover. In a system using such a soft handover technique, when a mobile station approaches a boundary between cells (or sectors), the mobile station simultaneusly communicates with plural base stations each having one of the cells as its service area.

When the mobile station detects a base station or stations at reception levels larger than the base station currently in communication therewith, the mobile station regards itself as approaching a cell boundary and starts communication with plural base stations including the currently connected base station and other base stations detected at the larger reception levels. The mobile station then receives the same downward information from the plural base stations, where the downward information from the plural base stations is received at the mobile station by a maximal ratio combining diversity.

Upward information transmitted from the mobile station is received at the plural base stations. These received signals are maximal ratio combined or one of these signal is by a base station controller (BSC) which supervises the plural base stations.

In general, any mobile station located near a cell boundary is likely far at a distance from the base station in the cell, and the reception level of downward signals from the base station would be low. Further, the channel quality is likely deteriorated near the cell boundary due to radio interference from plural cells. Such deterioration of the channel quality can be prevented by connecting the mobile station to plural base stations (by a soft handover).

In a conventional technique such as one conforming the IS-95 standard, the downward signals are simultaneously transmitted from plural base stations during soft handover. Such a system extremely increases the number of currently used down links compared with cellular systems not using the soft handover. An increase in the number of mobile stations during soft handover limits the number of links that can be used simultaneously because of a limited capacity of down links to cause a latent problem that efficiency in channel utilization can not be improved.

Although the IS-95 standard seems to use such an ineffective method that it transmits downward signals from plural base stations, the capacity of down links has not caused any problem because the transmission system of down links has been more effective than that of up links.

However, the capacity of up links is now improving as much as that of down links, and the deterioration in the capacity of down links due to the soft handover needs to be solved.

SUMMARY OF THE INVENTION

It is therefore the main object of the present invention to provide a soft handover scheme capable of improving efficiency of down links in a CDMA mobile communication system by improving a downstream transmission system in a soft handover with a terminal located near a cell or sector boundary.

According to one aspect of the invention, there is provided a cellular system using a direct spread code division multiple access system, in which a mobile station performs soft handover with plural base stations, said mobile station comprising:

- downward reception quality monitoring means for monitoring reception quality of downward signals from the plural base stations that are in the soft handover state;
- base-station specifying means for sending a signal to specify a base station or stations to be transmitted according to the result of monitoring the reception quality of the plural downward signals;
- multiplexing means for multiplexing the base-station specify signal into an upward signal to be sent to said plural base stations; and
- reception means for performing combined reception of receive signals from said plural base stations that are in the soft handover state, and said base stations each comprising:

- demodulation means for demodulating the base-station specify signal multiplexed in the upward signal; and
- transmission control means for controlling transmission of a downward transmit signal to a corresponding mobile station according to the demodulated base-station specify signal.

The mobile station monitors quality of downward signals from plural base stations in a handover state and multiplexes into an upward signal a signal to specify the best-quality base station. This permits only the base station in good channel conditions to perform downstream transmission even at the time of handover with inhibiting transmission from the other base stations, thus improving the frequency utilization efficiency of down links.

DETAILED DESCRIPTION OF THE PREFERRED EMBODIMENTS

Referring next to the accompanying drawings, the present invention will be described.

Figure 1:
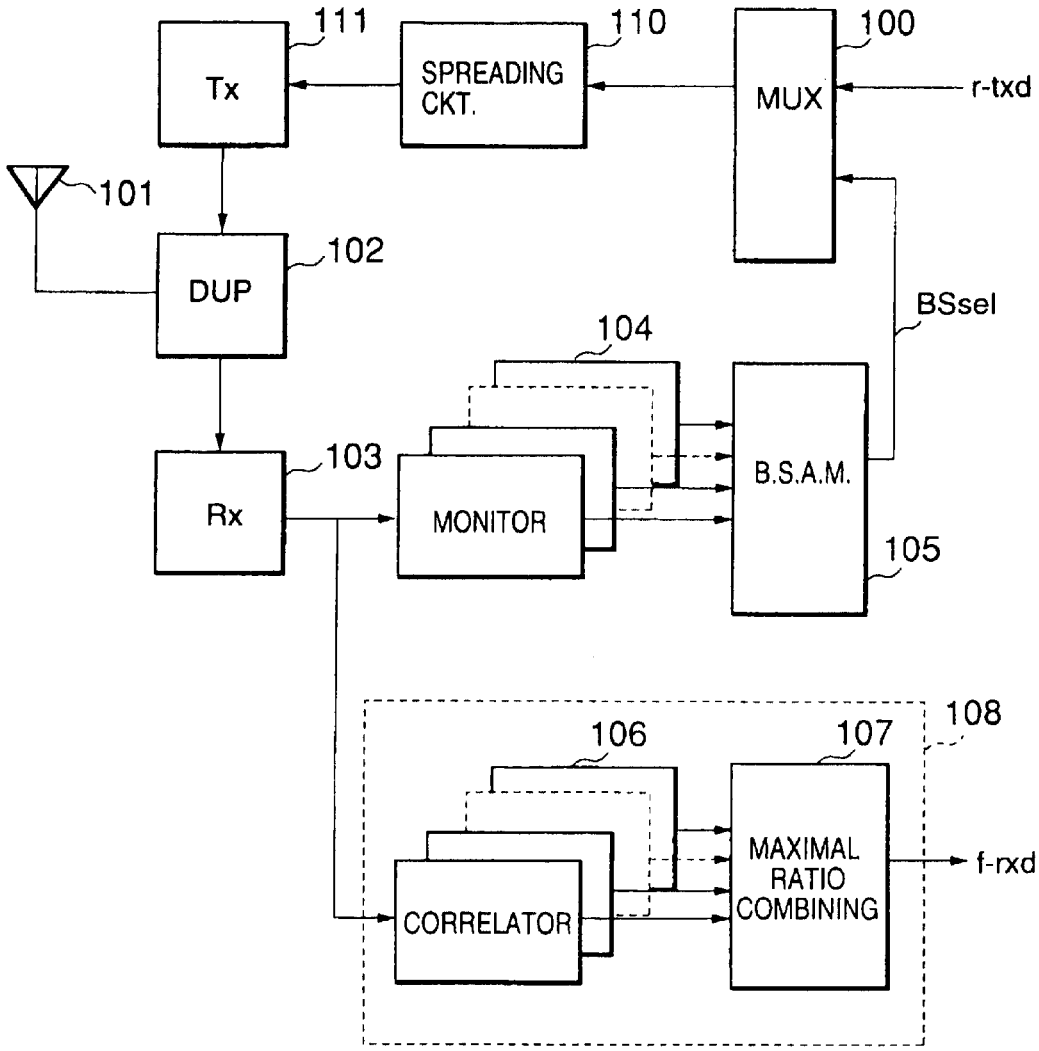
FIG. 1 is a block diagram showing the structure of a mobile station according to a first embodiment of the present invention.
Figure 2:
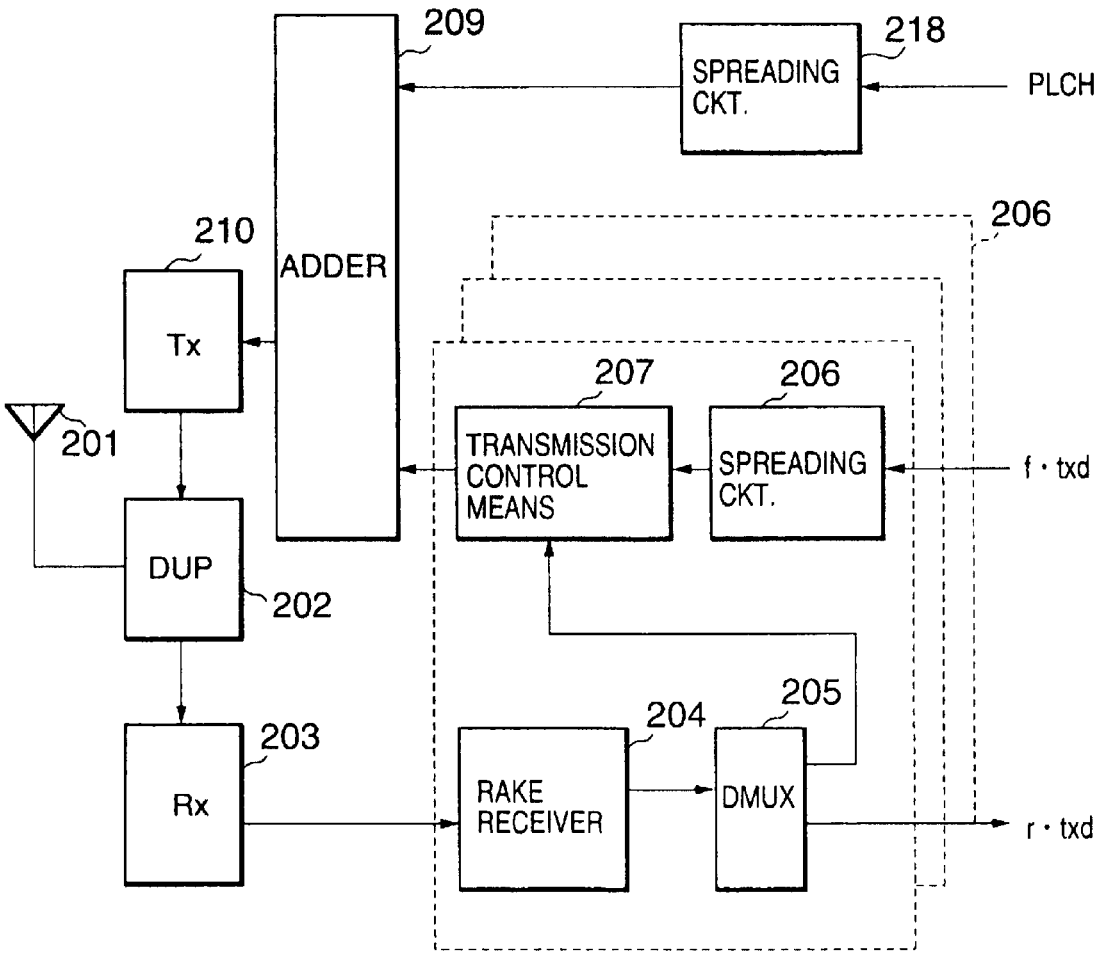
FIG. 2 is a block diagram showing the structure of a base station according to the first embodiment of the present invention.

FIG. 1 is a block diagram showing the structure of a mobile station according to a first embodiment of the present invention; FIG. 2 is a block diagram showing the structure of a base station according to the first embodiment of the present invention.

As shown in FIG. 1, the mobile station according to the first embodiment of the present invention comprises an antenna 101 for receiving radio signals from one or more base stations; a duplexer (DUP) 102; a radio receiving part (Rx) 103 for converting a radio signal to a receive base-band signal; reception quality monitoring means 104 for receiving pilot signals from plural base stations during handover and monitoring the level of reception quality; base-station specifying means (B.S.S.M) 105 for selecting base stations of good receiving quality based on the monitoring results and outputting a base-station select signal (BSse1) corresponding to the base stations of good reception quality; a multiplexer (MUX) 109 for multiplexing an associated control channel including the base-station select signal (BSse1) and upward communication channel data (r-txd) to generate an upward transmit signal; a spreading circuit 110 for spreading the upward transmit signal to output a transmit base-band signal; a radio transmitting part (Tx) 111 for converting the transmit base-band signal to a radio signal to be transmitted; and an RAKE receiver 108 for performing combined reception of receive base-band signals from plural base stations that are in a soft handover state.

The RAKE receiver 108 includes a correlator 106 and a maximal ratio combiner 107 for outputting downward communication channel data (f-txd).

The downward reception quality monitoring means 104 of the mobile station measures the level of reception quality using a pilot channel transmitted from each base station to all the mobile stations.

The base-station specifying means 105 selects base stations out of plural ones as having good downward reception quality, and outputs a base-station select signal indicative of the selected base stations. For this selection, any of the following criteria can be used:

(1) A base station showing the best reception quality and other base stations each of which has a small difference in reception quality from the best one are selected.

(2) A predetermined number of base stations equal to or less than the number of the base stations to be targeted in the current handover are selected in the order of the superiority of reception quality.

(3) Base stations showing reception quality larger than a predetermined value are selected. When all the base stations show reception quality smaller than the predetermined value, a predetermined number of base stations are selected in the order of the superiority of reception quality. This optional condition is provided to prevent all the base stations from stopping transmission when the downward-signal receiving quality is low at the mobile station.

Referring to FIG. 2, each base station according to the first embodiment of the present invention can be divided into a common section commonly used for plural communication channels and channel sections 208 separately used for each communication channel.

The common section comprises an antenna 201 for receiving radio signals from mobile stations; a duplexer (DUP) 202; a radio receiving part (Rx) 203 for converting a radio signal to a receive base-band signal; a spreading circuit 218 for spreading a pilot channel (PLCH); and an adder 209 for adding and combining the pilot channel and transmit signals of plural channels from the plural channel sections 208. The pilot channel and the plural communication channels use different spread codes from each other.

The channel section 208 necessary for each communication channel comprises an RAKE receiver 204 for reversely spreading signals received on a multipath channel and combining them at the maximum ratio; a demultiplexer (DMUX) 205 for separating the output of the RAKE receiver 204 into upward communication channel data (r-rxd) and the associated control channel including the base-station select signal (Bsse1); a spreading circuit 206 for spreading downward communication channel data (f-txd); and transmission control means 207 for controlling transmission ON/OFF according to the base-station select signal (Bsse1) included in the associated control channel data from the mobile station.

Figure 3:
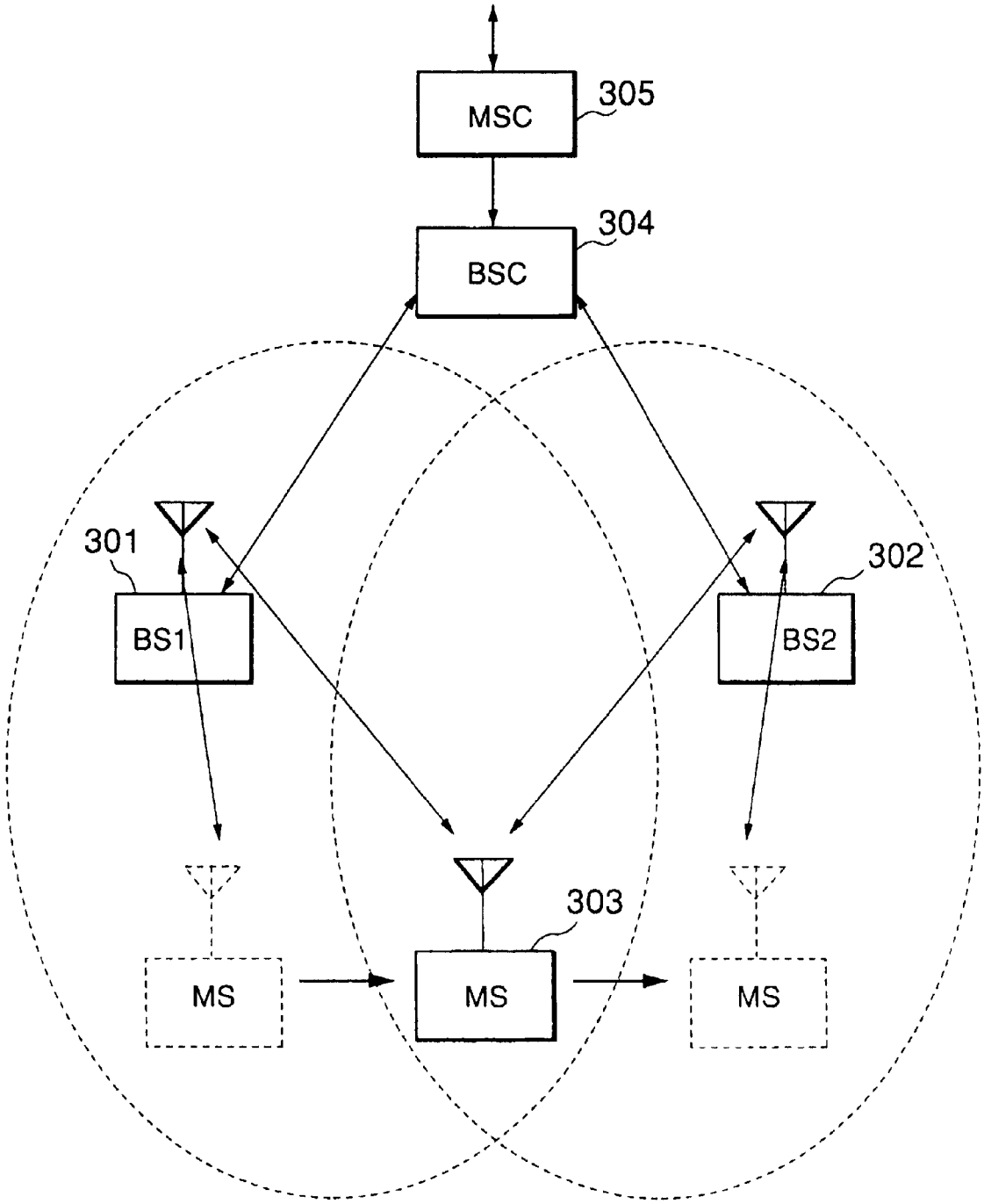
FIG. 3 is a view illustrating the movement of a mobile station that enters a soft handover operation of the present invention.

Referring next to FIG. 3, operations in the first embodiment of the present invention will be described.

FIG. 3 is a view illustrating the movement of a mobile station when performing a soft handover operation to be described below. In this case, when a mobile station (MS) 303 moves from a service area of a base station (BS1) 301 to another service area of another base station (BS2) 302 and enters a service-area overlapping zone, it becomes a soft handover state and the base station (BS2) also receives the upward communication channel data from the mobile station.

The base station (BS2) informs the base station controller (BSC) 304 the reception of the downward communication channel data from the moble station. The base station controller maximal-ratio-combines the received downward communication channel data at the base stations 301 and 302. the combined data is transmitted to a mobile station exchnger (MSC) 305. Then, the mobile station exchnger transfers the downward communication channel data not only to the base station (BS1) but also to the base station (BS2). These operations are the same as the prior art, such as IS-95 standards.

The operations of the base stations (BS1, BS) and the mobile station on the downward communication channel data are now described. In this example of FIG. 3, all the above criteria becomes the same and only one base station showing reception quality better than the other is selected.

The transmission control means 207 of each of the base stations 301 and 302 stops transmission when its own base station is not specified in the base-station select signal. The transmission control means 207 performs transmission to the mobile station when its own base station is specified in the base-station select signal or a transmission error in the base-station select signal is detected; otherwise, it will stop transmission.

Figure 4:
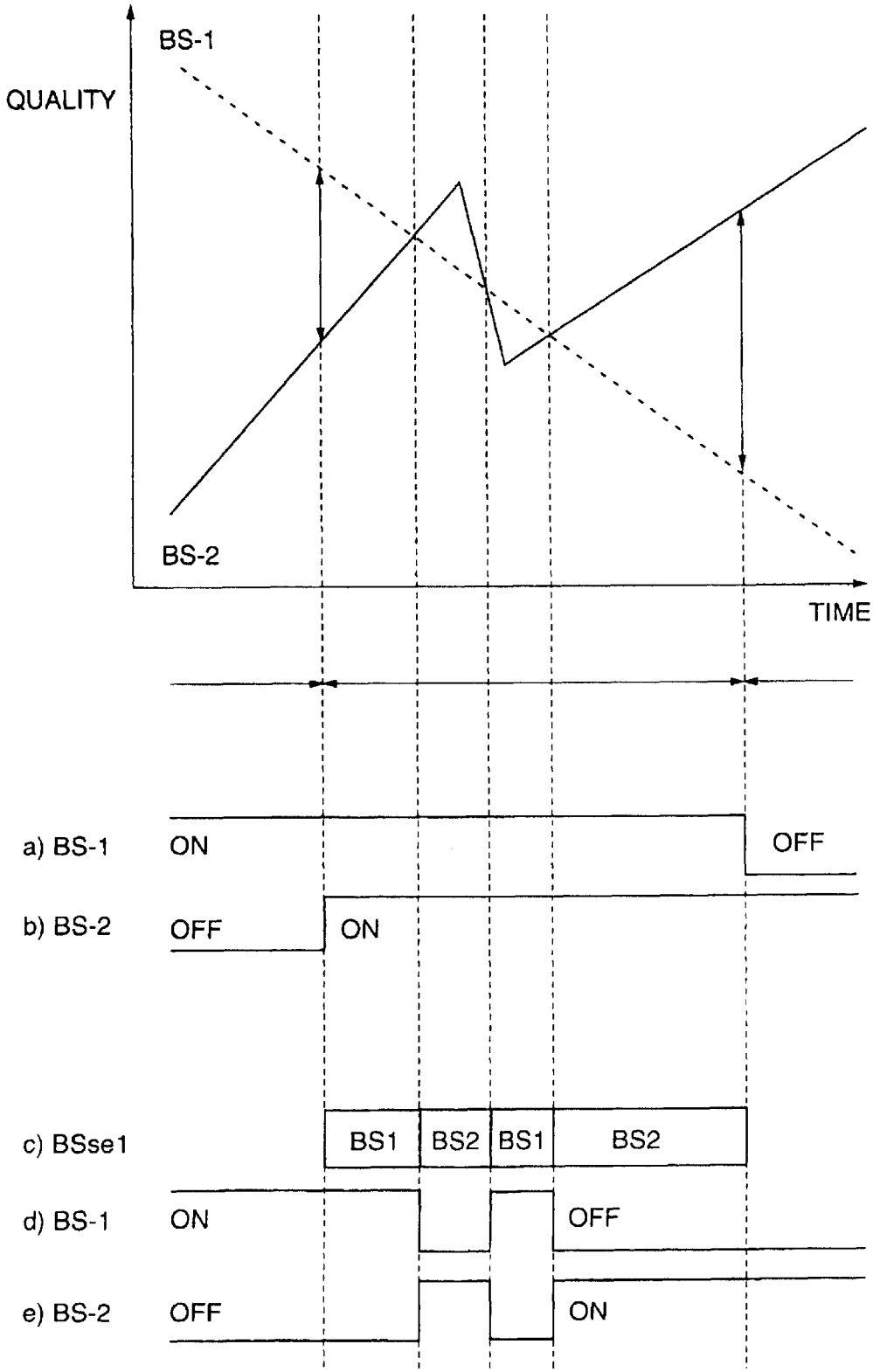
FIG. 4 is a time chart for comparing the prior art and the present invention, which shows a relationship between reception quality and transmission ON/OFF timing.

FIG. 4 is a time chart showing transitions of downward reception quality of the base stations 301 and 302, and transmission ON/OFF timing of each of the base stations (BS1 and BS2) 301 and 302.

In a conventional scheme (e.g., IS-95) as shown at a) and b) in FIG. 4, when the difference in reception quality between both base stations becomes smaller than a certain value, the two base stations enter a soft handover state and start transmission to the mobile station. This soft handover state continues until the difference in reception quality between both base stations becomes equal to or more than the certain value and the mobile station completely enters the service area of the new base station (BS2) 302. Thus in the conventional the two base stations perform transmission to the mobile station during the soft handover.

On the other hand, shown at c) to e) in FIG. 4 are the base-station select signals and transmission ON/OFF timings of the two base stations (BS1 and BS2) 301 and 302 in the embodiment of the invention. This shows that the base-station select signal varies with changes in the reception quality even during handover, and the transmission is always performed from only one base station in a propagation state better than the other.

The procedure for soft handover in the case of FIG. 3 is as follows:

[1] The mobile station 303 measures the reception quality of pilot channels from nearby base stations and reports the measurement result to the base stations in the same manner as in the conventional. When a base station or stations each showing reception quality of the pilot channel within a certain range of differences from that of the base station currently in communication with the mobile station 303 are detected, they enter the soft handover state.

[2] The base station currently in communication with the mobile station of identification numbers of base stations which are in soft handover state.

[3] The plural base stations that are in the soft handover state receive upward information from the mobile station in the same manner as in the conventional by a maximal ratio combining or selective diversity.

[4] The mobile station monitors the quality of the pilot channel of each base station in the soft handover state, and notifies all the base stations of a number of the best-quality base station using the upward associated control channel. The quality measurement and notification is not necessarily fast enough to track Rayleigh fading as long as it can track changes in the propagation path (shadowing).

[5] Only the base stations specified by the mobile station 303 are permitted to send downward information. In order to avoid the danger that no base station sends downward information, it is possible to permit the other base stations to send downward information when they have detected an error in CRC of the associated control channel.

[6] The mobile station 303 receives signals from the plural base stations using a selective or maximal ratio combining diversity.

[7] The soft handover is released when the difference in the reception quality of the pilot channel becomes equal to or more than the certain value.

By operating the base stations and the mobile station 303 in the above procedure, only some base stations of good propagation quality perform downstream transmission and the other base stations of inferior propagation quality do not need to perform downstream transmission. It is therefore possible to improve the frequency utilization efficiency of down links.

The mobile station 303 measures the quality of down links using the pilot channel, which is always transmitted at each base station and commonly used by all the mobile station to perform base station search. For this reason, the mobile station can also monitor the quality of down links of other base stations that have stopped transmission to the mobile station, and hence instruct these base stations to restart downstream transmission thereto.

When judging that the down links of plural base stations show almost equal quality and the received signals from the plural base stations can be combined at the maximum ratio without any loss, the mobile station 303 instructs the corresponding plural base stations to perform downstream transmission so that a diversity gain can be obtained.

When judging that the quality of down links of all the base stations is deteriorated and required quality can not be obtained by the transmission from one base station, the mobile station instructs plural base stations of relatively good reception quality to perform downstream transmission so that the required quality can be obtained.

The danger of an error in receiving the base-station select signal transmitted from the mobile station 303 must be considered here. Particularly, in the case the soft handover is performed across plural base stations, respective base stations may cause a different demodulation result and no base station may judge to be instructed for transmission. To avoid such a case, each base station performs transmission without receiving the instruction when an error in the demodulation result has been detected, thus extremely reducing the probability of no base station performing transmission [see the above procedure [5]).

However, if it is assured that plural base stations cause the same demodulation result of the base-station select signal, they can perform transmission ON/OFF according to the base-station select signal irrespective of the presence or absence of the error detection. For example, when the soft handover is performed for plural sectors within one base station, the demodulation result of the base-station select signal can be easily used among the sectors in common. In this case, the transmission sectors may be selected according to the base-station select signal.

Figure 5:
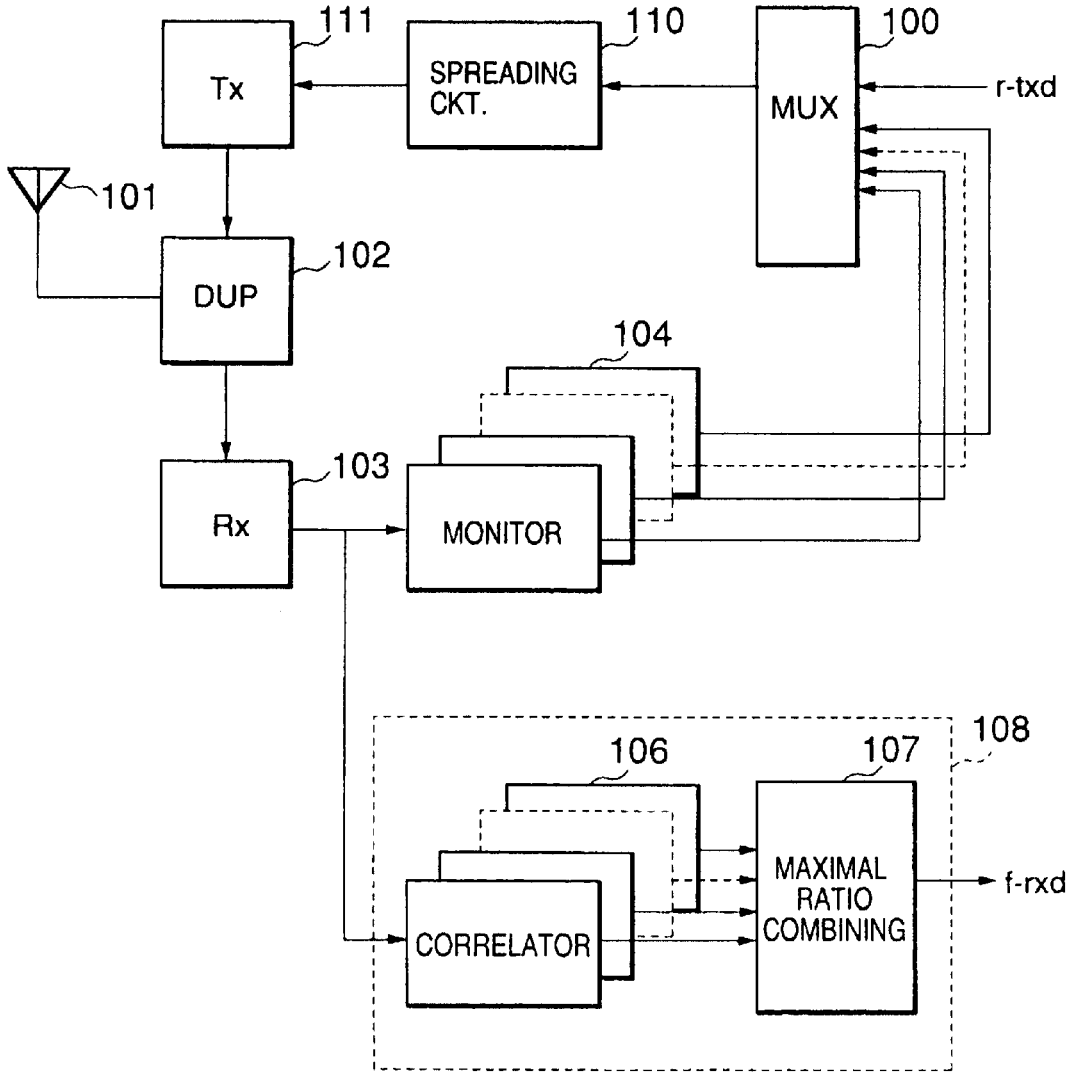
FIG. 5 is a block diagram showing the structure of a mobile station according to a second embodiment of the present invention.
Figure 6:
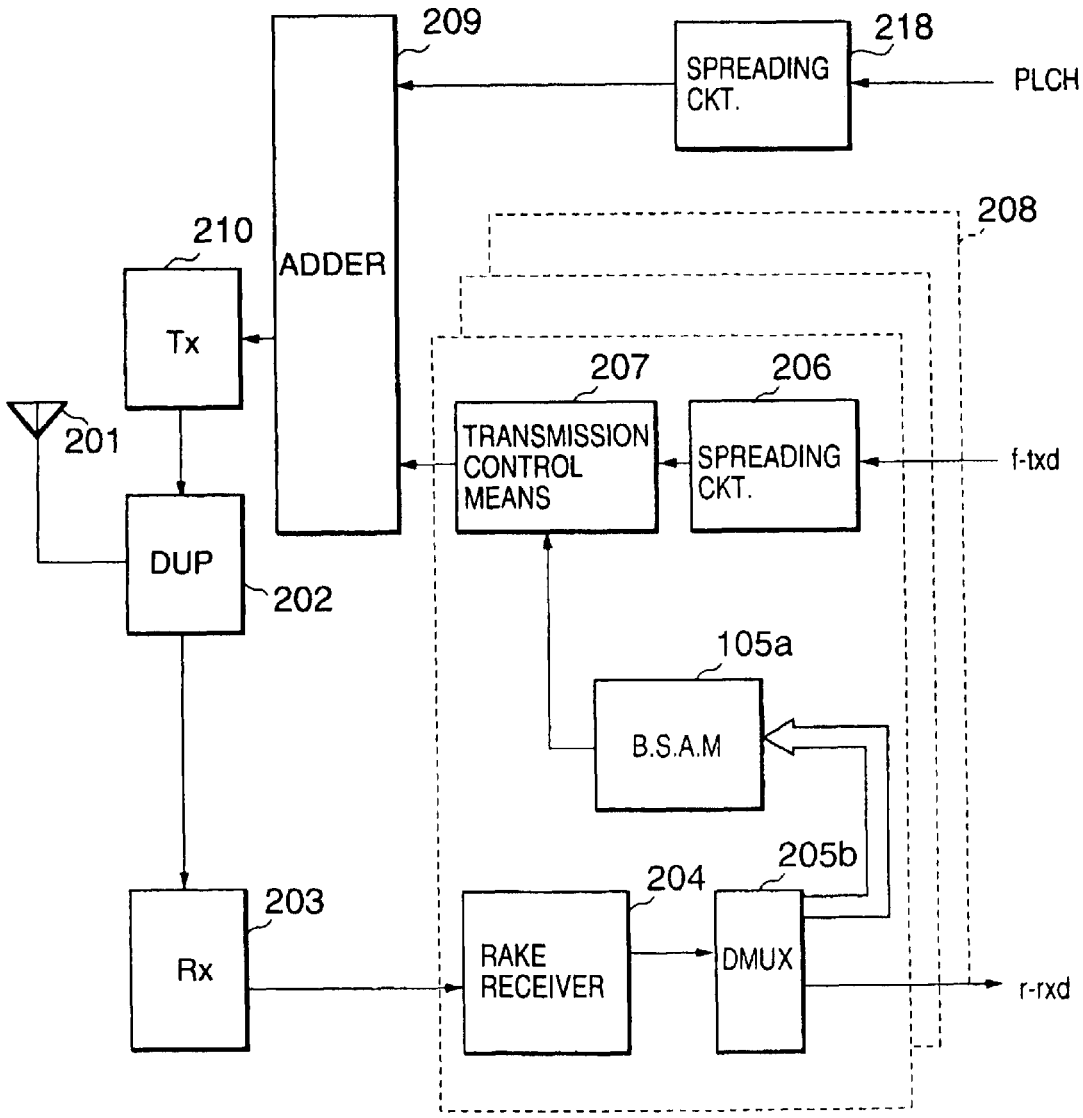
FIG. 6 is a block diagram showing the structure of a base station according to the second embodiment of the present invention.

Referring next to FIGS. 5 and 6, a second embodiment of the present invention will be described. FIG. 5 is a block diagram showing the structure of a mobile station according to the second embodiment of the present invention; FIG. 6 is a block diagram showing the structure of a base station according to the second embodiment of the present invention.

As apparent from a comparison between FIGS. 1 and 5, the mobile station of the second embodiment does not include means like the base station specifying means 105 included in the first embodiment. Alternatively, the mobile station according to the second embodiment is such that the results of monitoring the reception quality of pilot signals from acceptable base stations are supplied to a multiplexer 109a together with signals to specialize corresponding base stations. The multiplexer 109a multiplexes outputs of the reception quality monitor and the upward communication channel data (r-txd) to generate an upward transmit signal to be transferred to the spreading circuit 110. Operations of the other elements in FIG. 5 are the same as those of the mobile station shown in FIG. 1.

Also as apparent from a comparison between FIGS. 2 and 6, the base station of the second embodiment includes a demultiplexer (DMUX) 205b provided between the RAKE receiver 204 and the transmission control means 207 for separating the output of the RAKE receiver 204 into "upward communication channel data (r-txd)" and "the reception quality of the pilot signal and the signal to specialize the corresponding base station" detected by the mobile station (FIG. 5); and transmission halt signal generating means 105a for generating a transmission halt signal indicating whether or not transmission of all the signals but the pilot signal are to be halted at its own station and supplying the transmission halt signal to the transmission control means 207. The structure and the operation of the transmission halt signal generating means 105a are the same as those of the base station specifying means of FIG. 1. The other elements of which the description is omitted are operated in the same manner as those given the common reference numbers in FIG. 2.

As apparent from the above, the first embodiment and the second embodiment differ in the following point: In the first embodiment the mobile station decides which of base stations is to stop downstream transmission during soft handover, while in the second embodiment the base station decides which of base stations is to stop downstream transmission during the soft handover. Since the second embodiment does not need the base station specifying means 105 essential for the mobile station (FIG. 1) in the first embodiment, the mobile station of the second embodiment can be made compact compared with that of the first embodiment. The second embodiment can also reduce the power consumption compared with the first embodiment.

The transmission halt signal generating means 105a of the second embodiment can use any criterion such as one of the following three criteria for outputting the transmission halt signal.

(1a) The transmission halt signal generating means outputs the transmission halt signal when the downward signal from its own station to the mobile station shows a large difference in reception quality from that of the best-quality base station.

(2a) The transmission halt signal generating means outputs the transmission halt signal when the reception quality of the downward signal from its own station to the mobile station is ranked lower than a predetermined one graded according to their reception quality.

(3a) The transmission halt signal generating means outputs the transmission halt signal when the reception quality of the downward signal from its own station to the mobile station is smaller than a predetermined value. When all the base stations show reception quality smaller than the predetermined value and the reception quality of its own base station is ranked higher than the predetermined one graded according to their reception quality, the transmission halt signal generating means does not output the transmission halt signal even if the reception quality of the downward signal is smaller than the predetermined value. This optional condition is provided to prevent all the base station in the soft handover state from stopping transmission to the mobile station when the reception quality of the downward signals is low at the mobile station.

As described above, according to the present invention, since only a small number of base stations of the bast quality perform downstream transmission even at the time of soft handover, the frequency utilization efficiency of down links is not reduced. It is therefore possible to avoid limitations on the channel capacity.

The present invention is also to prevent transmission from the base station in an inferior propagation state even at the time of soft handover, so that mean transmission power of the base station can be reduced, thereby simplifying the transmission power amplifier at the base station.

Modifications of the invention herein disclosed will occur to a person skilled in the art and all such modifications are deemed to be within the scope of the invention as defined by the appended claims.

What is claimed is:

[1. A cellular system using a direct spread code division multiple access system, in which a mobile station performs soft handover with plural base stations, said mobile station comprising:

downward reception quality monitoring means for monitoring reception quality of downward signals from the plural base stations that are in the soft handover state;

base-station specifying means for comparing reception quality of downward signals from respective base stations monitored at said downward reception quality monitoring means, and for generating a base-station specify signal which specifies a base-station having the best reception quality monitoring result to maintain a signal transmission;

multiplexing means for multiplexing the base-station specify signal into an upward signal to be sent to said plural base stations; and reception means for performing combined reception of receive signals from said plural base stations that are in the soft handover state, and said base stations each comprising:

demodulation means for demodulating the base-station specify signal multiplexed in the upward signal; and transmission control means for receiving the base-station specifying signal demodulated by said demodulation means, for keeping a downward signal transmission when its own base station is specified in the base-station specify signal, and for stopping a downward signal transmission when its own base station is not specified in the base-station specify signal.]

[2. The cellular system according to claim 1, wherein said transmission control means ignores contents of said base-station specify signal and keeps a downward signal transmission when an error in the base-station specify signal is detected.]

[3. The cellular system according to claim 1, wherein said base station specifying means generates a base-station specify signal which specifies plural base stations each having a smaller difference of downward reception quality monitoring result than a predetermined value to maintain a signal transmission.]

[4. The cellular system according to claim 1, wherein said base station specifying means generates a base-station specify signal which specifies plural base stations each having smaller reception quality monitoring result than a predetermined value to maintain a signal transmission.]

[5. In a cellular system using a direct spread code division multiple access system, a mobile station used in the cellular system for performing soft handover with plural base stations, comprising:

downward reception quality monitoring means for monitoring reception quality of downward signals from the plural base stations that are in the soft handover state;

base-station specifying means for comparing reception quality of downward signals from respective base stations monitored at said downward reception quality monitoring means, and for generating a base-station specify signal which specifies a base-station having the best reception quality monitoring result to maintain a signal transmission;

multiplexing means for multiplexing the base-station specify signal into an upward signal to be sent to said plural base stations; and reception means for performing combined reception of receive signals from said plural base stations that are in the soft handover state.]

[6. The mobile station according to claim 5, wherein said base station specifying means generates a base-station specify signal which specifies plural base stations each having a smaller difference of reception quality monitoring result than a predetermined value to maintain a signal transmission.]

[7. The mobile station according to claim 5, wherein said base station specifying means generates a base-station specify signal which specifies plural base stations each having smaller reception quality monitoring result than a predetermined value to maintain a signal transmission.]

[8. A base station provided in a cellular system in which a plurality of mobile stations according to claim 5 are utilized, said base station comprising:

demodulation means for demodulating the base-station specify signal multiplexed in the upward signal; and transmission control means for receiving the base-station specify signal demodulated by said demodulation means, for keeping a downward signal transmission when its own base station is specified in the base-station specify signal, and for stopping a downward signal transmission when its own base station is not specified in the base-station specify signal.]

[9. The base station according to claim 8, wherein said transmission control means ignores contents of the base-station specify signal and keeps a downward signal transmission when an error is detected in the base-station specify signal.]

[10. A cellular system using a direct spread code division multiple access system, in which a mobile station performs soft handover with plural base stations, said mobile station comprising:

reception quality monitoring means for monitoring reception quality of downward signals from the plural base stations that are in the soft handover state and outputting a sub-signal composed of the monitoring results and signals indicative of base stations corresponding to the respective results;

multiplexing means for multiplexing the sub-signal into an upward signal to be sent to said plural base stations; and reception means for performing combined reception of receive signals from said plural base stations that are in the soft handover state, and said base stations each comprising:

demodulation means for demodulating the sub-signal multiplexed in the upward signal;

transmission halt signal generating means for receiving the sub-signal demodulated by said demodulation means, comparing reception quality of downward signals from respective base stations monitored at the mobile station indicated in the sub-signal, and for generating a transmission halt signal which indicates a signal transmission instruction whether transmission should be allowed or halted at its own base station in accordance with the reception quality monitoring result indicated in the sub-signal; and transmission control means for receiving the transmission halt signal from said transmission halt signal generating means, and for setting a signal transmission state of a downward signal from its own base station, whether a signal transmitting or a signal stopping, in accordance with the instruction indicated in the transmission halt signal.]

[11. The cellular system according to claim 10, wherein said transmission halt signal generating means generates the transmission halt signal with an instruction of signal transmission stopped when the best reception quality monitoring result is not indicated for its own base station in the sub-signal, and said transmission control means sets the signal transmitting state of its own base station to a signal stopping condition when the transmission halt signal indicates the instruction of signal transmission stopped.]

[12. The cellular system according to claim 10, wherein said transmission halt signal generating means generates the transmission halt signal with an instruction of signal transmission allowed when an error is detected in the sub-signal, and said transmission control means sets the signal transmitting state of own base station to a signal transmitting condition when the transmission halt signal indicates the instruction of signal transmission allowed.]

[13. The cellular system according to claim 10, wherein said transmission halt signal generating means generates the transmission halt signal with an instruction of signal transmission allowed when reception quality monitoring results of plural base stations in the sub-signal each having smaller difference than a predetermined value, and said transmission control means sets the signal transmitting state of own base station to a signal transmitting when the transmission halt signal indicates the instruction of signal transmission allowed.]

[14. The cellular system according to claim 10, wherein said transmission halt signal generating means generates the transmission halt signal with an instruction of signal transmission allowed when reception quality monitoring results of plural base stations in the sub-signal are smaller than a predetermined value, and said transmission control means sets the signal transmitting state of its own base station to a signal transmitting condition when the transmission halt signal indicates the instruction of signal transmission allowed.]

[15. A base station provided in a cellular system in which a plurality mobile stations, each equipped with means for monitoring reception quality of downward signals from plural base stations with soft handover state and transmitting a sub-signal composed of the monitoring results for each base station, are utilized, said base station comprising:

demodulation means for demodulating the sub-signal;

transmission halt signal generating means for receiving the sub-signal demodulated by said demodulation means, comparing reception quality of downward signals from respective base stations monitored at the mobile station indicated in the sub-signal, and for generating a transmission halt signal which indicates a signal transmission instruction whether allowed or halted at its own base station in accordance with the reception quality monitoring result indicated in the sub-signal; and transmission control means for receiving the transmission halt signal from said transmission halt signal generating means, and for setting a signal transmission state of a downward signal from its own base station, whether a signal transmitting or a signal stopping, in accordance with the instruction indicated in the transmission halt signal.]

[16. The base station according to claim 15, wherein said transmission halt signal generating means generates the transmission halt signal with an instruction of signal transmission allowed when an error is detected in the sub-signal, and said transmission control means sets the signal transmitting state of its own base station to a signal transmitting condition when the transmission halt signal indicates the instruction of signal transmission allowed.]

[17. The base station according to claim 15, wherein said transmission halt signal generating means generates the transmission halt signal with an instruction of signal transmission allowed when reception quality monitoring results of plural base stations in the sub-signal each having a smaller difference each other than a predetermined value, and said transmission control means put the signal transmitting when the transmission halt signal indicates the instruction of signal transmission allowed.]

[18. The base station according to claim 15, wherein said transmission halt signal generating means generates the transmission hall signal with an instruction of signal transmission allowed when reception quality monitoring results of plural base stations in the sub-signal are smaller than a predetermined value, and said transmission control means sets the signal transmitting sate of its own base station to a signal transmitting condition when the transmission halt signal indicates the instruction of signal transmission allowed.]

*19. A mobile station in a communication system, comprising:*

*a monitor which monitors, in a soft handover state, reception qualities of pilot signals from a plurality of base stations;*

*a base station selector which compares the reception qualities monitored by said monitor and generates a base station select signal specifying a base station on the basis of the reception qualities compared; and*

*a transmitter which transmits the base station select signal to a first base station that transmits a downward communication channel to said mobile station if the first base station is specified by the base station select signal and to a second base station, among the plurality of base stations, that stops a downward communication channel to said mobile station if the second base station is not specified by the base station select signal.*

*20. A mobile station according to claim 19, further comprising*

*a multiplexer which multiplexes the base station select signal and upward data into an upward signal, wherein said transmitter transmits the upward signal.*

*21. A mobile station according to claim 19, wherein*

*the base station select signal specifies a base station that is transmitting a pilot signal of the best reception quality.*

*22. A mobile station in a communication system, comprising:*

*a monitor which monitors, in a soft handover state, reception qualities of pilot signals from a plurality of base stations;*

*a base station selector which compares the reception qualities monitored by said monitor and generates a base station select signal specifying a base station on the basis of the reception qualities compared; and*

*a transmitter which transmits the base station select signal to all of the plurality of base stations including a base station that is to stop transmission of a downward communication channel to said mobile station if the base station is not specified by the base station select signal.*

*23. A mobile station in a communication system, comprising:*

*a monitoring means for monitoring, in a soft handover state, reception qualities of pilot signals from a plurality of base stations;*

*a base station selecting means for comparing the reception qualities monitored by said monitor and generating a base station select signal specifying a base station on the basis of the reception qualities compared; and*

*a transmitting means for transmitting the base station select signal to a first base station that transmits a downward communication channel to said mobile station if the first base station is specified by the base station select signal and to a second base station, among the plurality of base stations, that stops a downward communication channel to said mobile station if the second base station is not specified by the base station select signal.*

*24. A mobile station in a communication system, comprising:*

*a monitoring means for monitoring, in a soft handover state, reception qualities of pilot signals from a plurality of base stations;*

*a base station selecting means for comparing the reception qualities monitored by said monitor and generating a base station select signal specifying a base station on the basis of the reception qualities compared; and*

*a transmitting means for transmitting the base station select signal to all of the plurality of base stations including a base station that is to stop transmission of a downward communication channel to said mobile station if the base station is not specified by the base station select signal.*

*25. A base station among a plurality of base stations in a communication system comprising:*

*a receiver which receives, from a mobile station, a base station select signal specifying a base station that is to perform transmission of a downward communication channel to said mobile station, wherein said receiver receives the base station select signal that specifies said base station comprising said receiver or, alternatively, the base station select signal that does not specify said base station comprising said receiver, in a soft handover state with respect to the mobile station; and*

*a transmitter which transmits a downward communication channel to the mobile station when said base station comprising said transmitter is specified by the base station select signal received, and stops the transmission of the downward communication channel to the mobile station when said base station comprising said transmitter is not specified by the base station select signal received.*

*26. A base station according to claim 25, wherein*

*the base station select signal and upward data are multiplexed into an upward signal, and said receiver receives the upward signal.*

*27. A base station according to claim 25, wherein*

*the base station select signal specifies the base station that is transmitting a pilot signal of the best receiving quality at the mobile station.*

*28. A base station among a plurality of base stations in a communication system, comprising:*

*a receiver which receives, from a mobile station, a base station select signal that is transmitted to all base stations, among the plurality of base stations, including a base station that is to stop transmission of a downward communication channel to said mobile station if the base station is not specified by the base station select signal; and*

*a transmitter which transmits the downward communication channel to the mobile station when said base station comprising said transmitter is specified by the base station select signal received.*

*29. A base station among a plurality of base stations in a communication system comprising:*

*a receiver which receives, from a mobile station, a base station select signal specifying a base station that is to perform transmission of a downward communication channel to said mobile station, wherein said receiver receives the base station select signal that specifies its own base station or, alternatively, the base station select signal that does not specify its own base station, in a soft handover state with respect to the mobile station; and*

*a transmitter which transmits a downward communication channel to the mobile station when said base station comprising said transmitter is specified by the base station select signal received, and stops the transmission of the downward communication channel to the mobile station when said base station comprising said transmitter is not specified by the base station select signal received.*

*30. A base station among a plurality of base stations in a communication system comprising:*

*a receiving means for receiving, from a mobile station, a base station select signal specifying a base station that is to perform transmission of a downward communication channel to said mobile station; and*

*a transmitting means for transmitting a downward communication channel to the mobile station when said base station comprising said transmitting means is specified by the base station select signal received, and stopping the transmission of the downward communication channel to the mobile station when said base station comprising said transmitting means is not specified by the base station select signal received, wherein*

*said receiving means receives the base station select signal that specifies said base station comprising said receiving means or, alternatively, the base station select signal that does not specify said base station comprising said receiving means in a soft handover state with respect to the mobile station.*

*31. A base station among a plurality of base stations in a communication system, comprising:*

*a receiving means for receiving, from a mobile station, a base station select signal being transmitted to all base stations, among the plurality of base stations, including a base station that is to stop transmission of a downward communication channel to said mobile station if the base station is not specified by the base station select signal; and*

*a transmitting means for transmitting the downward communication channel to the mobile station when said base station comprising said transmitting means is specified by the base station select signal received.*

*32. A base station among a plurality of base stations in a communication system comprising:*

*a receiving means for receiving, from a mobile station, a base station select signal specifying a base station that is to perform transmission of a downward communication channel to said mobile station; and*

*a transmitting means for transmitting a downward communication channel to the mobile station when said base station comprising said transmitting means is specified by the base station select signal received, and stopping the transmission of the downward communication channel to the mobile station when said base station comprising said transmitting means is not specified by the base station select signal received, wherein*

*said receiving means receives the base station select signal that specifies its own base station or, alternatively, the base station select signal that does not specify its own base station, in a soft handover state with respect to the mobile station.*

*33. A communication method in a mobile station, comprising:*

*monitoring, in a soft handover state, reception qualities of pilot signals from a plurality of base stations;*

*comparing the reception qualities monitored;*

*generating a base station select signal specifying a base station on the basis of the reception qualities compared; and*

*transmitting the base station select signal to a first base station that transmits a downward communication channel to said mobile station if the first base station is specified by the base station select signal and to a second base station, among the plurality of base stations, that stops a downward communication channel to said mobile station if the second base station is not specified by the base station select signal.*

*34. A communication method in a mobile station, comprising:*

*monitoring, in a soft handover state, reception qualities of pilot signals from a plurality of base stations;*

*comparing the reception qualities monitored;*

*generating a base station select signal specifying a base station on the basis of the reception qualities compared; and*

*transmitting the base station select signal to all of the plurality of base stations including a base station that is to stop transmission of a downward communication channel to a mobile station if the base station is not specified by the base station select signal.*

*35. A communication method, comprising:*

*at a base station, receiving, from a mobile station, a base station select signal specifying a base station that is to perform transmission of a downward communication channel to said mobile station, comprising*

*receiving the base station select signal that specifies said base station receiving the base station select signal or, alternatively, the base station select signal that does not specify said base station receiving the base station select signal, in a soft handover state with respect to the mobile station; and*

*transmitting, from a transmitter, a downward communication channel to the mobile station when said base station comprising the transmitter is specified by the base station select signal received, and stopping the transmission of the downward communication channel to the mobile station when the base station comprising the transmitter is not specified by the base station select signal received.*

*36. A communication method in communication system which comprises a plurality of base stations, comprising:*

*at a base station, receiving, from a mobile station, a base station select signal that is transmitted to all base stations, among the plurality of base stations, including a base station that is to stop transmission of a downward communication channel to said mobile station if the base station is not specified by the base station select signal; and*

*transmitting the downward communication channel to the mobile station when said base station receiving the base station select signal is specified by the base station select station receiving the signal received.*

*37. A communication system comprising a mobile station and a plurality of base stations, wherein*

*said mobile station comprises:*

*a monitor which monitors, in a soft handover state, reception qualities of pilot signals from the plurality of base stations;*

*a base station selector which compares the reception qualities monitored by said monitor and generates a base station select signal on the basis of the reception qualities compared; and*

*a transmitter which transmits the base station select signal to a first base station that transmits a downward communication channel to said mobile station if the first base station is specified by the base station select signal and to a second base station, among the plurality of base stations, that stops a downward communication channel to said mobile station if the second base station is not specified by the base station select signal, and*

*each of the plurality of base stations comprises*

*a receiver which receives, from said mobile station, the base station select signal that specifics said base station comprising said receiver or, alternatively, the base station select signal that does not specify said base station comprising said receiver in a soft handover state with respect to the mobile station.*

* * * * *